United States Patent
Fritzer et al.

(10) Patent No.: US 8,086,381 B2
(45) Date of Patent: Dec. 27, 2011

(54) METHOD FOR THE EMERGENCY ACTUATION OF AN AUTOMATED DOUBLE CLUTCH TRANSMISSION OF A MOTOR VEHICLE

(75) Inventors: Anton Fritzer, Markdorf (DE); Markus Herrmann, Scheidegg (DE); Thilo Schmidt, Meckenbeuren (DE); Christian Popp, Kressbronn (DE); Georg Gierer, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 438 days.

(21) Appl. No.: 12/513,932

(22) PCT Filed: Nov. 5, 2007

(86) PCT No.: PCT/EP2007/061845
§ 371 (c)(1),
(2), (4) Date: May 7, 2009

(87) PCT Pub. No.: WO2008/058857
PCT Pub. Date: May 22, 2008

(65) Prior Publication Data
US 2010/0042302 A1    Feb. 18, 2010

(30) Foreign Application Priority Data
Nov. 17, 2006 (DE) .......................... 10 2006 054 253

(51) Int. Cl.
*G01M 17/00* (2006.01)
(52) U.S. Cl. ............... 701/63; 701/51; 701/29; 477/906
(58) Field of Classification Search .................... 701/62, 701/51, 55, 63, 64, 29; 477/906, 174; 74/330, 74/331

See application file for complete search history.

(56) References Cited

U.S. PATENT DOCUMENTS

| | | | | |
|---|---|---|---|---|
| 5,014,577 A | * | 5/1991 | Takada et al. | 477/130 |
| 5,484,352 A | * | 1/1996 | Kuma | 477/125 |
| 5,493,928 A | * | 2/1996 | Mitchell et al. | 74/335 |
| 5,527,233 A | * | 6/1996 | Tabata et al. | 477/62 |
| 6,463,821 B1 | * | 10/2002 | Reed et al. | 74/330 |
| 7,153,234 B2 | * | 12/2006 | Berger et al. | 477/86 |
| 7,163,096 B2 | | 1/2007 | Neuner | |
| 7,338,408 B2 | * | 3/2008 | Petrzik et al. | 477/174 |
| 7,487,864 B2 | * | 2/2009 | Kohlhaas et al. | 192/3.58 |

(Continued)

FOREIGN PATENT DOCUMENTS
DE        103 38 355 A1    3/2005
(Continued)

*Primary Examiner* — Toan C To
*Assistant Examiner* — Karen A Beck
(74) *Attorney, Agent, or Firm* — Davis & Bujold, P.L.L.C.

(57) ABSTRACT

A method for emergency actuation of an automated dual-clutch transmission of a vehicle with electrohydraulic control via a transmission control device. The method includes disengaging one clutch of the dual-clutch transmission, in order to realize emergency operation of the transmission and applying pressure on the other clutch after an error signal is transmitted indicating a malfunction of the transmission and/or the transmission control device. In order to keep the complexity of the hardware of the hydraulic system low, both clutches are disengaged, when an error signal occurs, and adjusted to a safe initial state, and an actuating pressure is only re-applied to one of the two clutches after the initial state is reached. In addition to the already existing elements of the hydraulic system, only one device or software is required which detects and selects the clutch that is more advantageous for continued driving operation.

9 Claims, 1 Drawing Sheet

U.S. PATENT DOCUMENTS

| | | | |
|---|---|---|---|
| 7,689,340 B2 * | 3/2010 | Schweizer | 701/67 |
| 8,024,988 B2 * | 9/2011 | Vennemann | 74/330 |
| 2007/0074944 A1 | 4/2007 | Leibbrandt et al. | |
| 2007/0123388 A1 * | 5/2007 | Petrzik et al. | 477/174 |
| 2009/0164058 A1 * | 6/2009 | Seufert et al. | 701/29 |

FOREIGN PATENT DOCUMENTS

| | | |
|---|---|---|
| DE | 10 2004 018 962 B2 | 10/2005 |
| DE | 10 2004 033 362 A1 | 1/2006 |
| EP | 1 519 082 A1 | 3/2005 |
| EP | 1 767 825 A1 | 3/2007 |
| WO | 03/074909 A2 | 9/2003 |

* cited by examiner

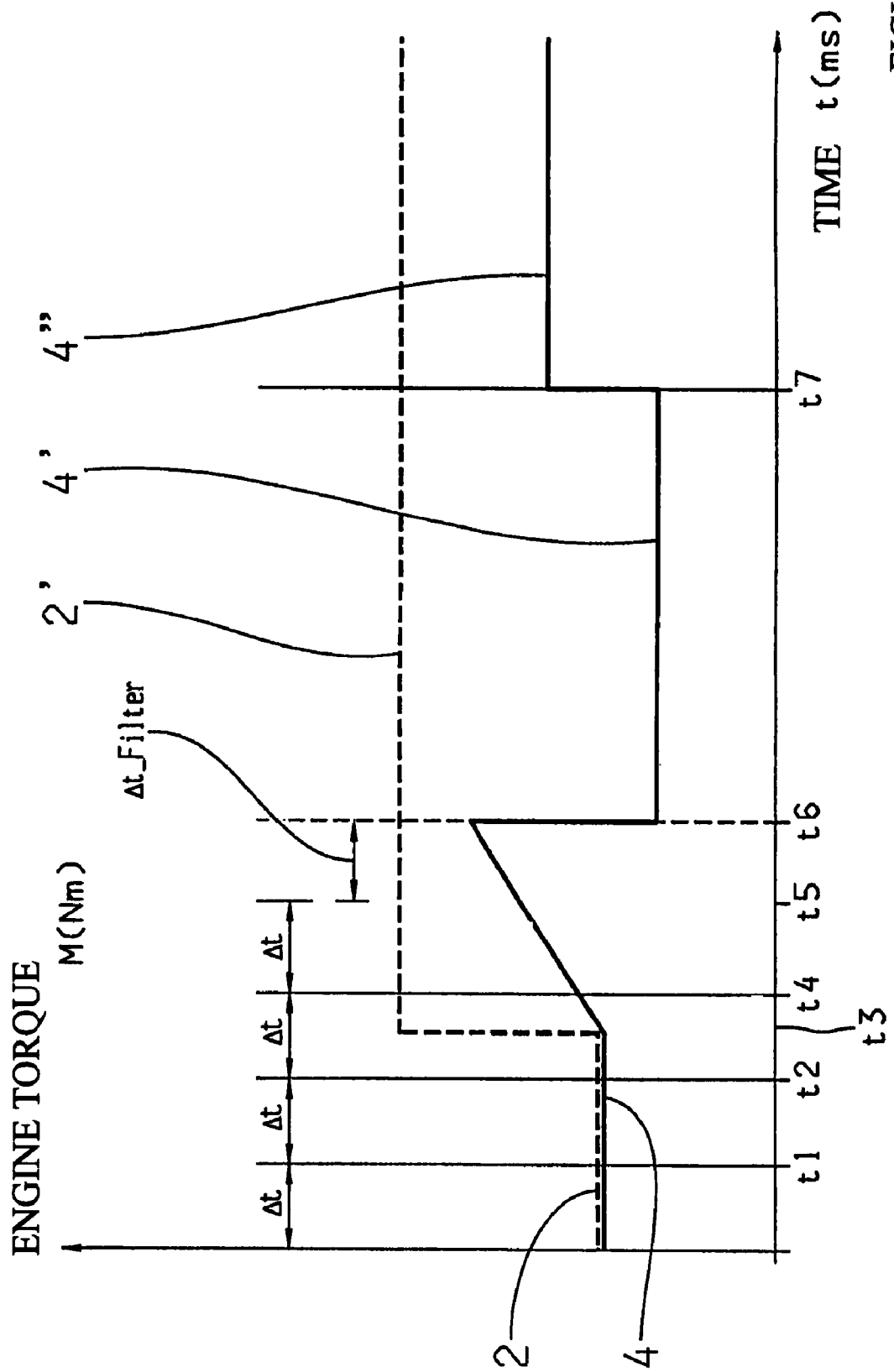

ical circuit of a dual-clutch transmission in
METHOD FOR THE EMERGENCY ACTUATION OF AN AUTOMATED DOUBLE CLUTCH TRANSMISSION OF A MOTOR VEHICLE This application is a National Stage completion of PCT/EP2007/061845 filed Nov. 5, 2007, which claims priority from German patent application serial no. 10 2006 054 253.3 filed Nov. 17, 2006.

FIELD OF THE INVENTION

The invention relates to a process for emergency actuation of an automatic dual-clutch transmission of a vehicle with electrohydraulic control via a transmission control device.

BACKGROUND OF THE INVENTION

Dual-clutch transmissions are known to consist of two partial transmissions, each with an input shaft that can be connected to a driving engine via an allocated separately actuable clutch. In the first partial transmission, for example, the gears for the odd gear ratios are disposed and in the second partial transmission are arranged the gears for the even gear ratios.

During operation, one gear ratio of a partial transmission is respectively active, when the clutch is engaged, while a gear ratio of the other partial transmission can be preselected, when the clutch is disengaged. In order to change gears, the engaged clutch is then disengaged and the disengaged clutch is engaged such that essentially no torque interruption occurs in the drive train. The engagement and disengagement of the two clutches, as well as shifting of the gear ratios, are carried out via a transmission control device. Electrohydraulic actuators are generally utilized as actuators for actuating the clutches, as well as for actuating the gear ratio levels. Special control measures must be met, if a malfunction occurs in the region of the transmission, for example, in one of the partial transmissions.

Described in DE 103 38 355 A1 is a dual-clutch transmission, in which the electrohydraulic control adjusts to an initial state in which both clutches are disengaged in case of a failure or malfunction of the electronic system which leads to an interruption of the drive torque in the drive train independent of the present driving situation. This is undesirable in at least some driving situations, since then the vehicle only coasts, when there is a failure of the electronic system, the driver is not warned ahead of time, and the vehicle cannot be purposefully parked.

In order to solve this problem, the above-mentioned DE 103 38 355 A1 proposes a control process in which the shifting states of the clutches, directly before failure of the clutch control or electronic system, should be retained at least in some shift states of the clutches in case of a malfunction in the region of the transmission. In order to achieve this, the dual-clutch transmission has a separate "state retention hydraulic." In case of a failure of the clutch control or the electronic system, the state retention hydraulic controls first or second hydraulics which are allocated to the first or second clutch via hydraulic control lines in such a way at least in some starting shift states of the clutches, that the shift state that was present directly before the failure of the electronic system is retained. This allows at least completion of the present driving maneuver and purposeful parking of the vehicle.

Proposed in DE 10 2004 018 962 B3 is a process for controlling a hydraulic circuit of a dual-clutch transmission in which a safe state of the system is ensured by means of a safety circuit, when an error occurs. The safety circuit is designed in such a way, that, when a partial error occurs which is only allocated to one of the two clutches, this clutch is disengaged and, if a total failure occurs which is allocated to both clutches, the clutch whose clutch pressure was lower, when the total failure occurred, is disengaged and the other clutch whose clutch pressure was higher when the total failure occurred, is not disengaged, in order to continue transmission of torque via this clutch. If a partial failure occurs, the vehicle can continue being operated via the partial transmission that is not affected by the failure, so that limited driving operation is possible. If a total failure occurs, the presently existing driving state is retained, so that a driving maneuver can be completed and the vehicle can be safely parked.

In DE 103 38 355 A1 as well as also in DE 10 2004 018 962 B3, it is provided, that a presently applied control pressure is retained for at least one of the clutches by means of the separate state retention hydraulics or the separate safety circuit respectively, when a malfunction occurs which requires considerable hardware complexity in the hydraulic shifting system.

SUMMARY OF THE INVENTION

It is an object of the invention to create a process for emergency actuation of an automated dual-clutch transmission of a vehicle which makes possible a safe driving operation, when a malfunction occurs in the transmission control, its sensors or actuators, with the least possible hardware circuit complexity at least to the extent, that a driving maneuver which is just now taking place can be safely completed and the vehicle can be purposefully parked.

The invention is based on the realization, that the circuit complexity of the hardware can be considerably reduced, if the requirement of retaining the control pressure of the clutches when a malfunction occurs is abandoned and, if necessary, a short-term interruption of the drive torque is allowed instead.

The invention is based for this reason on a process for emergency actuation of an automated dual-clutch transmission of a vehicle with electrohydraulic control via a transmission control device, wherein one clutch of the dual-clutch transmission is disengaged, in order to sustain emergency operation of the transmission and pressure is applied on the other clutch, after an error signal indicating a malfunction of the transmission and/or its transmission control device occurs. For this purpose the invention provides, that both clutches are disengaged and transferred into a safe initial state, when an error signal occurs, and that an actuating pressure is again applied on one of the two clutches, after the initial state is reached.

The method is preferably carried out in such a way, that the clutch with the highest hydraulic pressure at the time of the malfunction is selected after the initial state is reached and an actuating pressure is again applied thereon.

The method steps comprise only functions that can be carried out with the already existing circuit hardware, wherein merely one device or software must be additionally provided which detects and selects the clutch with the highest hydraulic pressure. Complex electrohydraulic circuit elements, such as those of the state of the art, which ensure, that the hydraulic pressure on the selected clutch is retained during the entire transition from normal operation to hydraulic emergency operation, are not required herein.

In order to ensure that an actuating pressure is again applied on the selected clutch only when the current driving state of the vehicle allows it, it is provided according to another embodiment of the invention, that first specific driving state variables which characterize the current driving state of the vehicle are measured after the safe initial state is reached, and that the renewed application of actuating pressure on the selected clutch takes place only when the driving state variables are within predetermined limit values.

Provided in particular as driving state variables that can serve as entry criteria for an eventual reapplication of pressure on the selected clutch are, for example, the engine speed, the transmission output speed, or the hydraulic pump speed, wherein a respective minimum speed of these driving state variables is utilized as predetermined limit value.

In order to avoid endangering the transmission, the output drive train, as well as finally the driving state of the vehicle and to configure as comfortably as possible the transition into the initial state and the operating state after new application of actuating pressure on the clutch, it is provided according to another embodiment of the invention, that the renewed pressure application on the selected clutch is carried out in connection with an intervention in the engine control ("self-sustaining engine intervention"), by means of which, for example, the engine torque or the engine speed can be adapted to the current driving state. The engine control which is likewise in general a component of the complete vehicle control receives the necessary signals from sensors which are known per se and which measure the driving state in a way, that does not have to be described in detail.

In order to provide the complete system with the time required for the transition into the initial state and into the subsequent limited driving operation, it is provided according to another preferred embodiment of the invention, that when the error signal occurs, the motor torque is first limited to a predetermined lower value and is held for a predetermined transition time span during which the disengagement of the two clutches, the transition into a safe initial state, the measurement of the driving state variables, and, if required, the renewed application of actuating pressure on the selected clutch takes place, and that the engine torque is adjusted to a predetermined emergency torque and limited after the transition time span.

The trigger of the self-sustaining engine intervention can be, for example, a so-called "alive counter" signal of the electronic transmission control device which functions in such a way, that malfunction monitoring is carried out by means of a signal generator which delivers a function signal, that indicates the correct function of the transmission at regular intervals to the engine control, wherein the mentioned intervention takes place in the engine control for the realization of the emergency operation after the function signal has been absent and a predetermined filter time span has passed.

Correct functioning of the transmission is monitored via speed sensors, pressure sensors, torque sensors, path sensors, and the like, which are allocated thereto and transmit their sensor signals to the transmission control device according to another embodiment of the invention.

As was already mentioned above, at least one state is created by means of the process according to the invention which allows continuation of the current driving operation, continued driving until the closest mechanic shop, or, if required, a purposeful parking of the vehicle, with the prerequisite that the entry criteria be fulfilled. According to another embodiment of the invention, it is provided, that after the transition time span has passed during which the disengagement of the clutches the transition into the safe initial state, and the measurement of the driving state variables takes place, the transmission control device switches into standby control mode, with which the affected hydraulic branch, that is, for example, the affected partial transmission is shut down, and a limited driving operation can be maintained with, for example, shifting of the gear ratio levels allocated to the intact partial transmission.

BRIEF DESCRIPTION OF THE DRAWING

The invention will be explained in greater detail below with reference to the enclosed drawing.

The single FIGURE shows a flow diagram of an intervention in the engine control with the aid of an alive counter signal.

DETAILED DESCRIPTION OF THE PREFERRED EMBODIMENTS

The engine torque M is plotted on the ordinate and the time t is plotted on the abscissa of the coordinate system represented in the drawing. The electronic transmission control device, which monitors the correct operation of the transmission with the aid of the above-mentioned sensors, supplies a function signal indicating proper functioning of the transmission at regular intervals $\Delta t$ to the motor control. As can be seen in the drawing on the basis of the continuous vertical lines, a function signal such as this is generated at the time points $t_1$, $t_2$, and $t_4$.

A demand generated by the driver or a speed limit limiter is supplied between the time points $t_2$ and $t_4$, that is, at the time point $t_3$, for example, for an increase of the target torque 2 represented with dashed lines to a value 2' which up to this time point coincided with the actual torque 4 represented with a continuous line. This procedure is assessed as a correct function by the transmission control device, so that thereafter at the time point $t_4$, a corresponding function signal is supplied.

The actual torque 4 increases with an oblique line starting at the time point $t_3$ according to the available demand.

A malfunction takes place between the time points $t_4$ and $t_5$, so that the function signal provided for the time point $t_5$ is absent. After a filter time span $\Delta t\_filter$, the engine control reacts to reduce the actual torque 4 starting at the time point $t_6$ to a predetermined lower value 4' and the latter is held for a predetermined transition time span $t_6$ to $t_7$.

The disengagement of the two clutches, the transition into the safe initial state, and the measurement of the driving state variables occur during the transition time span $t_6$ to $t_7$. In the case where the entry criteria mentioned above are met, the actual torque increases to a predetermined emergency operation torque 4'' at the time point $t_7$ after renewed application of actuating pressure on the selected clutch which allows purposeful parking of the vehicle or also transition into the above-described standby control mode.

REFERENCE CHARACTERS

2 Target torque
2' Target torque
4 Actual torque
4' Lowest value of the actual torque
4'' Emergency operation torque
$\Delta t$ Time interval
$\Delta t$-Filter Filter time span
$t_1$-$t_7$ Time points
t Time
M Engine torque

The invention claimed is:

1. A method of emergency actuation of an automated dual-clutch transmission of a vehicle with electrohydraulic control via a transmission control device, wherein, after an error is signaled indicating malfunction of at least one of the transmission and a transmission control device, one clutch of the dual-clutch transmission is disengaged to realize emergency operation of the transmission and pressure is applied to the other clutch, the method comprising the steps of:

disengaging both clutches, when an error signal occurs, transferring both clutches into a secure initial state, and reapplying an actuating pressure, after the initial state is reached, to one of the two clutches.

2. The method according to claim 1, further comprising the steps of selecting the clutch, at a point time of the malfunction, with the highest hydraulic pressure and reapplying the actuating pressure the selected clutch after the initial state is reached.

3. The method according to claim 1, further comprising the steps of measuring specific driving state variables which characterize a current driving state of the vehicle, after the initial state is reached, and reapplying the actuating pressure on the selected clutch only when the driving state variables are within predetermined limit values.

4. The method according to claim 3, further comprising the steps of defining the driving state variables as at least one of engine speed, transmission output speed, and hydraulic pump speed and utilizing a respective minimum speed as the predetermined limit value.

5. The method according to claim 2, further comprising the step of reapplying the actuating pressure on the selected clutch in connection with intervention of an engine control, by which either engine torque or engine speed is adapted to a current driving state.

6. The method according to claim 5, further comprising the step of limiting the engine torque to a predetermined lower value (4') and retaining the engine torque for a predetermined transition time span ($t_6$ to $t_7$), when the error signal occurs, during which the disengagement of the two clutches, the transition into the initial state, the measurement of the driving state variables, and, if required, the reapplication of actuating pressure on the selected clutch take place and the engine torque is increased, and limited to a predetermined emergency operation torque (4") after the transition time span has passed.

7. The method according to claim 1, further comprising the step of monitoring for malfunction by way of a signal generator which supplies a function signal at regular intervals ($\Delta t$) to a motor control indicating a correct function of the transmission such that intervention of the engine control takes place after the function signal is absent and a predetermined filter time span ($\Delta t$-Filter) passes.

8. The method according to claim 7, further comprising the step of monitoring at least one of speed sensors, pressure sensors, torque sensors, and path sensors, which are allocated thereto as the correct function of the transmission and transmitting the sensor signals to the signal generator.

9. The method according to claim 6, further comprising the step of switching the transmission control device to a standby control mode after the transition time span ($t_6$ to $t_7$) passes.

* * * * *